United States Patent [19]

Hattori

[11] Patent Number: 4,765,683
[45] Date of Patent: Aug. 23, 1988

[54] HEADREST APPARATUS

[75] Inventor: Takemi Hattori, Kariya, Japan

[73] Assignee: Aisin Seiki Kabushiki Kaisha, Kariya, Japan

[21] Appl. No.: 935,329

[22] Filed: Nov. 26, 1986

[30] Foreign Application Priority Data

Nov. 26, 1985 [JP] Japan .................. 60-263912

[51] Int. Cl.⁴ .................. A47C 1/10
[52] U.S. Cl. .................. 297/410; 297/61; 297/408
[58] Field of Search ............ 297/61, 408, 403, 410

[56] References Cited

U.S. PATENT DOCUMENTS 2,989,341 6/1961 Schliephacke .............. 297/61

FOREIGN PATENT DOCUMENTS 3130780 3/1983 Fed. Rep. of Germany ...... 297/410
3141515 4/1983 Fed. Rep. of Germany ...... 297/410
0014530 1/1984 Japan .................. 297/410
2057255 4/1981 United Kingdom ........... 297/410

Primary Examiner—James T. McCall
Attorney, Agent, or Firm—Finnegan, Henderson, Farabow, Garrett & Dunner

[57] ABSTRACT

A headrest apparatus for vehicles comprising a pair of guide rails connected on a seatback frame and a pair of stays connected to the headrest. A pair of shoes are positioned for movement along the guide rails with each of the shoes supporting a separate one of the stays. A rod member which is connected at its ends to the pair of shoes, and means for moving the rod in an upward and downward direction are provided. The upward and downward movement of the rod moves the shoes in their respective guiderails to raise and lower the headrest. A cam member is attached at an upper portion of each said guide rail for urging the shoes along a selected path and the headrest to an inclined position.

15 Claims, 5 Drawing Sheets

HEADREST APPARATUS

BACKGROUND OF THE INVENTION

1. Field of the Invention

The present invention relates to a headrest apparatus, and more particularly to a headrest for vehicles.

2. Description of the Prior Art

It is well known, for example, from the Japanese Laid Open Publication No. 59 (1984)-14530, that the field of vision of a driver looking through a rearview mirror, and of passengers seated in the rear seat of a vehicle, is enlarged by forwardly reclining a headrest attached to a seat. In a conventional headrest shown in FIG. 7, a headrest 1 is connected to one end of each of a pair of stays 2. The other end of each stay 2 is connected to a hinged portion 3. A pair of pipe-shaped supports 5 is fixed to a seatback frame 4. A head of a passenger is supported by the headrest 1 when the stays 2 of the headrest 1 are inserted into the supports 5. When the headrest is raised so that the hinged portions 3 of the stays are pulled outwardly from and clear of the supports 5, the hinges enable the headrest to be pivoted forward.

When the headrest is lifted up and is forwardly pivoted in this conventional apparatus, a top end portion of each support 5, and the hinged portion 3 of each stay 2, are exposed and constitute a projection facing a rear portion of the vehicle. Obviously, such projections may be a hazard for passengers seated in the rear seats of the vehicle in the event of a sudden braking of the vehicle. Moreover, even when forwardly pivoted, the conventional headrest apparatus can project above the top of the seat constituting an obstruction to the view of a driver. Furthermore, when the headrest mechanism is installed on a rear seat it is difficult for a driver or passenger in the front seat to operate the mechanism since he must lean over the front seat to reach the headrest.

SUMMARY OF THE INVENTION

An object of the present invention is to provide an improved headrest apparatus which obviates the aforementioned drawbacks of the described conventional headrest.

A further object of the present invention is to provide an improved headrest apparatus which can be easily and reliably moved and inclined, and which does not present a safety hazard for rear seat passengers when inclined.

A further object of this invention is to provide an improved headrest apparatus which is relatively simple in manufacture and includes a minimum number of parts.

Additional objects and advantages of the invention will be set forth in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects, and in accordance with the purposes of the invention, as embodied and broadly described herein, a headrest is provided comprising a pair of guide rails connected to a seatback frame and a pair of stays connected to the headrest; a pair of shoes positioned for movement along the guide rails with each of the shoes supporting a separate one of the stays; a rod member connected at its ends to the pair of shoes; means for moving the rod in an upward and downward direction thereby moving the shoes in their respective guiderails to raise and lower the headrest; and a cam member attached at an upper portion of each said guide rail for urging the shoes along a selected path and the headrest to an inclined position.

Preferably, the cam surface of the cam member is configured to forwardly incline the headrest to a horizontal position below the projection of the seatback as the shoes are moved along the cam surface.

The accompanying drawings, which are incorporated in and constitute a part of the specification, illustrate a preferred embodiment of the invention and, together with the general description given above and the detailed description of the preferred embodiment given below, serve to explain the principles of the invention.

DESCRIPTION OF THE PREFERRED EMBODIMENT

Reference will now be made in detail to the present preferred embodiment of the invention as illustrated in the accompanying drawings.

Figure 1:
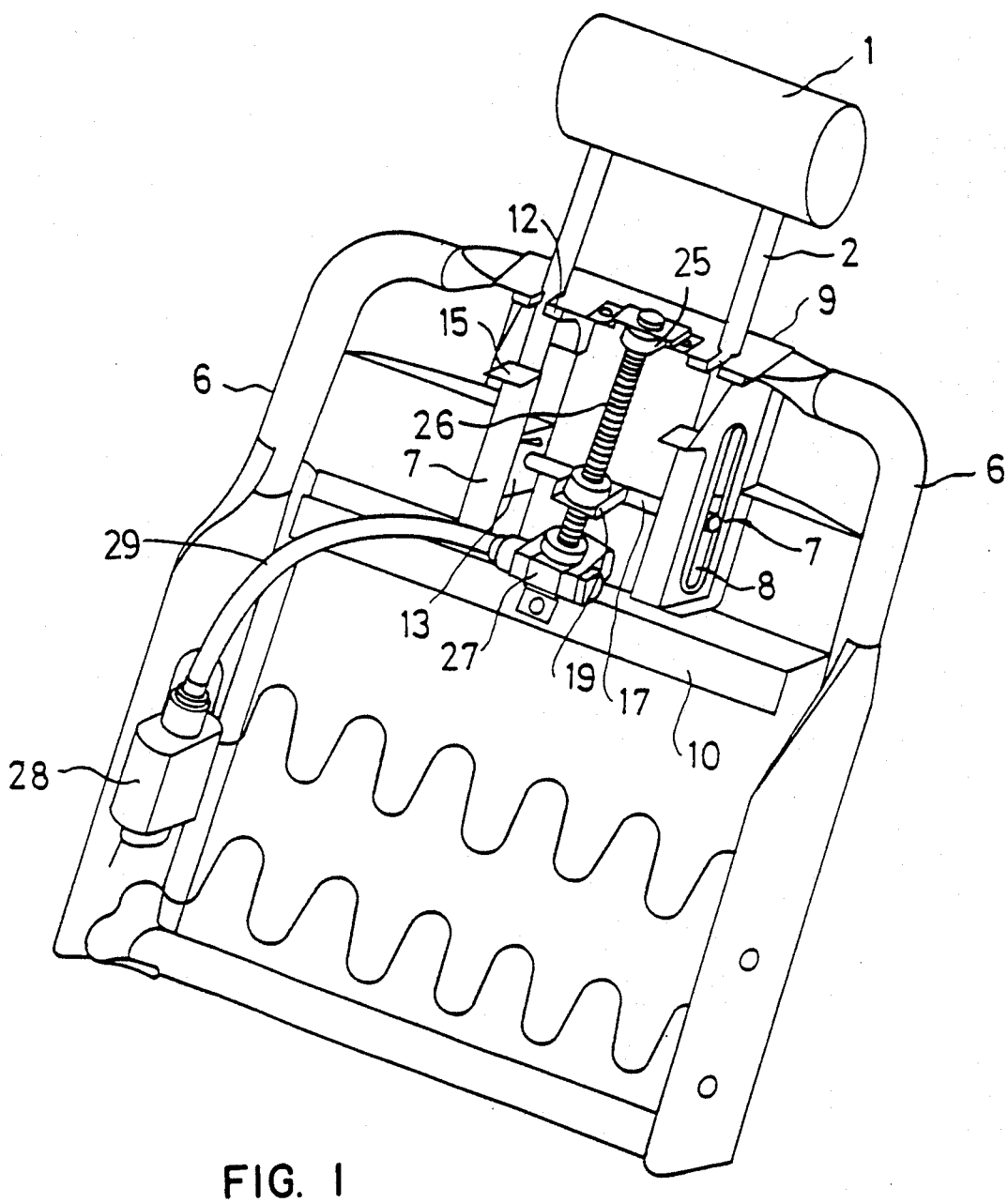
FIG. 1 is a cross-section of an automobile seat incorporating the preferred embodiment of a headrest apparatus constructed in accordance with the present invention.
Figure 2:
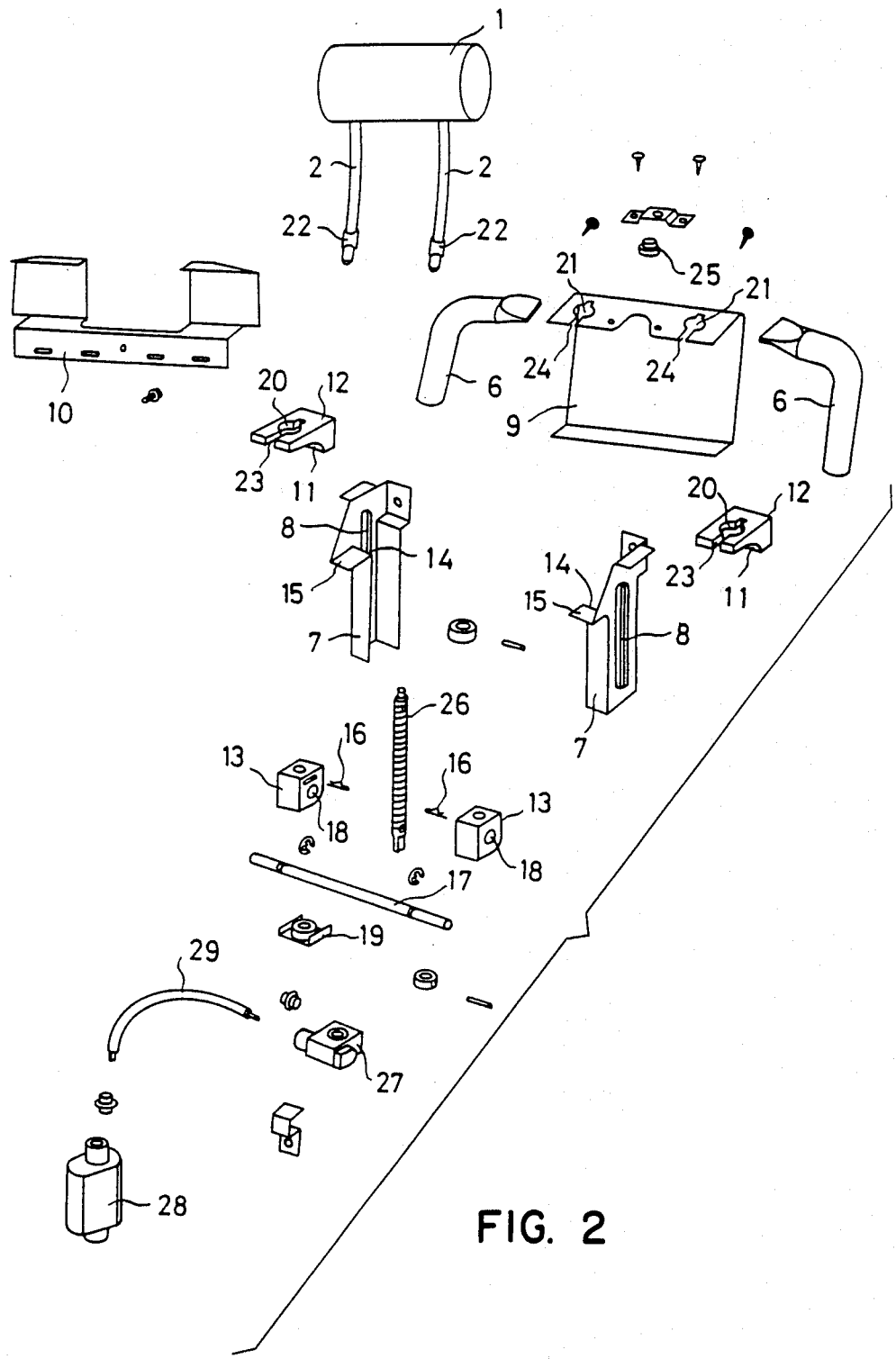
FIG. 2 is an exploded view of the headrest apparatus of FIG. 1.

Referring to FIGS. 1 and 2, a pair of guide rails 7 are connected to a seatback frame 6. Each guide rail is substantially U-shaped in cross-section and is provided with an elongated hole 8 in the lateral wall thereof. In this embodiment, the guide rails 7 are interposed and connected between an upper panel 9 and a lower panel 10 fixed to the seatback frame 6. However, the guide rails 7 may be positioned on the frame 6 by any method which secures the position of the rails relative to the frame. A cam member 12 having a cam surface 11 is attached on an upper end of each guide rail 7. A guide piece 15 having an edge surface 14 is provided on an upper surface of each guide rail 7 for guiding, in combination with the cam surface 11, a pair of shoes 13 located in respective guide rails 7.

Each shoe 13 receives a lower portion of a respective stay 2. Cotter pins 16 are utilized for attaching stays 2 on the shoes 13. The pair of shoes 13 are connected together by a rod 17. The attachment of the rod 17 to each shoe 13 is accomplished by passing the rod 17 through apertures 18 in each shoe 13 and holding the rod in place by E-rings. The opposite end portions of the rod 17 extend through the elongated holes 8 of the guide rails 7. A nut member 19 is fixed to the central portion of the rod 17.

The stays 2, supported at respective lower ends by the shoes 13, upwardly extend from the seatback frame 6 through a hole 20 in each of the cam members 12, and aligned holes 21 located in the upper panel 9. Each stay 2 has a flat portion 22 at a suitable position thereof which is movable within the respective slits 23 of cam members 12 and the slits 24 of the holes 21 of upper panel 9.

In accordance with the invention, there is provided a means for moving the rod 17 in an upward and downward direction to thereby move shoes 13 in respective guide rails 7 to raise and lower headrest 1. As embodied herein the means for moving rod 7 includes a threaded rod 26, rotatably supported on the upper panel 9 by a bushing 25, and a nut 19 connected to a central portion of rod 7 and engaged with threaded rod 26.

In accordance with the instant invention, there is further provided a means for providing a rotational torque to threaded rod 26 which, in the preferred embodiment described herein, comprises a gear box 27, connected to an electric motor 28 through a cable 29. Gear box 27 rotates the rod 26 by receiving a rotational torque from electric motor 28 through cable 29. The rotational movement of the threaded rod 26 moves nut 19 and rod 17 vertically, thus moving shoes 13 along guide rails 7.

Figure 4:
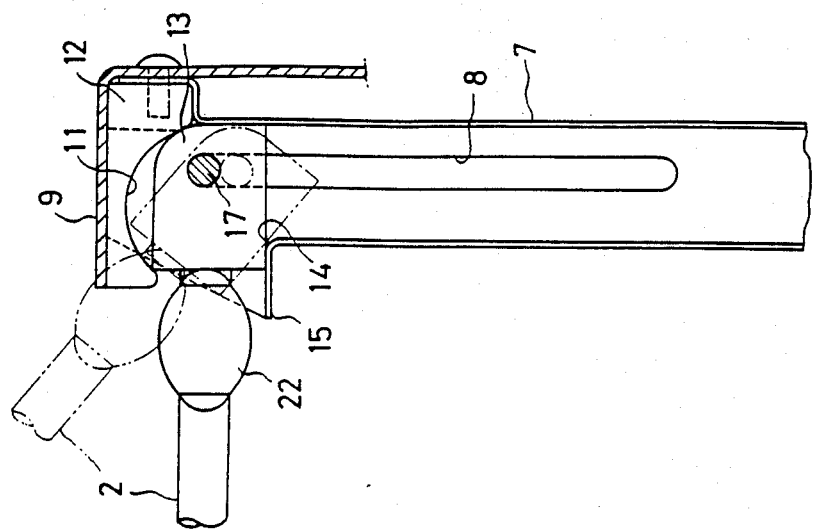
FIGS. 3 and 4 are partial side views of a headrest embodying the present invention wherein the movement of a shoe along a guide rail is shown.
Figure 3:
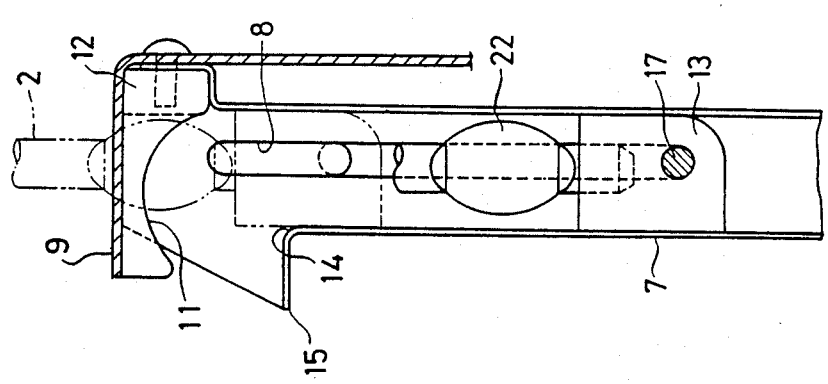

Now referring to FIGS. 3 and 4, the inclining of the headrest will be described. When the threaded rod 26 is rotated, the rod 17 and nut member 19 move vertically and the shoes 13 move along the guide rails 7. The distal end portions of the rod 17, by extending through the elongated slots 8, ensure that the movement of the shoes 13 is in the desired direction.

As shoes 13 move upwardly, the upper edge of each shoe 13 will contact the cam surface 11 of the cam member 12, and the shoe will begin to rotate relative to the seatback frame 6 (not shown). The partial rotation of the shoe and stay is shown by the dotted lines in FIG. 4. The flat portions 22 of the stays 2 move into slits 23 of cam members 12 and slits 24 of the upper panel 9. As shown in FIG. 4, cam surface 11 is configured to rotate shoes 13 and stays 2 between about 0° and 90° relative to seatback frame 6. Cam surface 11 of member 12, acting on the shoes 13, continue to force rotation of the stays 2 relative to the frame 6. The shape of the flat portions 22 of stays 2 can be made to any desired configuration complementary to the slits 23 and 24. The edge surfaces 14 of the guide pieces 15 serve as a guide and a support of the shoes 13 as the shoes follow cam surface 11.

The headrest 1 (not shown), because it is connected to the stays 2, also begins to incline forwardly as shoes 13 move along cam surfaces 11. Continued upward movement of the rod 17 causes it to contact the upper end of elongated holes 8 of the guide rails 7, and the rotational movement of shoes 13 is stopped at the position shown by a solid line in FIG. 4. Headrest 1, fixed to the stay 2, is in a forwardly (or rearwardly) inclined position. The upper end of the elongated hole 8 of the guide rail 7 thus serves as a stop for the rising upward movement of the rod 17 during operation and restricts the forward inclination of the headrest 1.

When the rotation of the electric motor 28 is reversed, the rotation of the cable 29 and the gear in gear box 27 is reversed and the threaded rod 26 is withdrawn through the nut member 19 to return the headrest 1 to its original, upright position. As the rod 17 is lowered along the elongated holes 8 by the counter-rotation of the threaded rod 26, the shoes 13 are guided into the guide rail 7 by the cam surface 11 and the edge portion 14 as shown in FIG. 3.

In the preferred embodiment the electric motor 28 is used to rotate threaded rod 26. However, the means for providing a rotational torque to the threaded rod 26 may alternatively include a hand crank connected to the cable 29 and positioned to be turned manually by the driver to rotate the rod 26. Apart from inclining the headrest 1, the height of the headrest can also be adjusted by changing the position of the shoes 13 in guide rails 7.

Figures 5, 6:
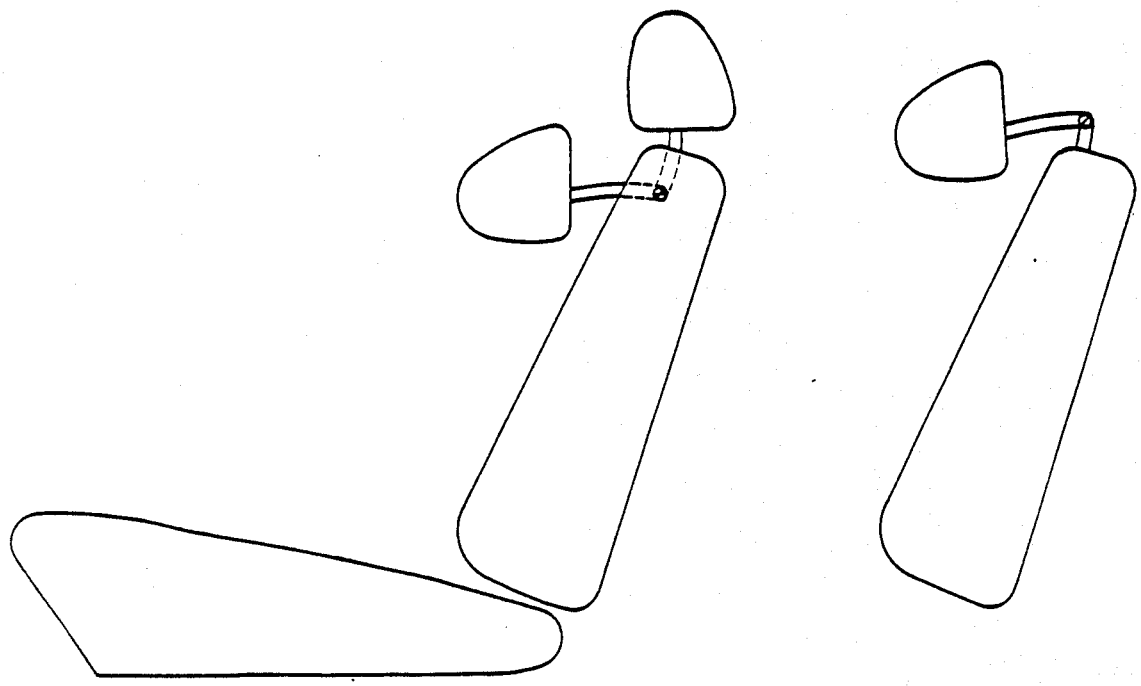
FIG. 5 is a side view of an automobile seat illustrating a reclined state of a headrest incorporating the present invention.
FIG. 6 is a side view of an automobile seat showing a reclined state of a conventional headrest.
Figure 7:
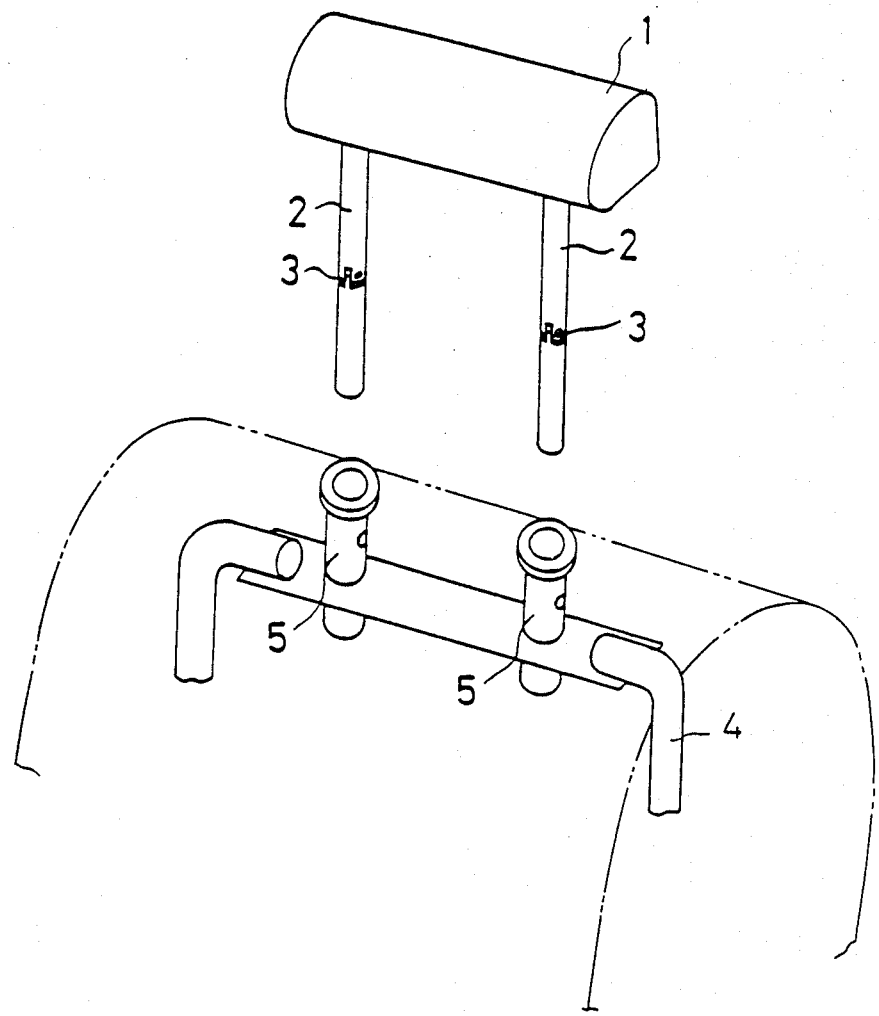
FIG. 7 is a cross-section of a conventional headrest.

As viewed in FIG. 5, and in accordance with the instant invention, the headrest 1 when moved to an inclined position does not project above the top portion of the seatback in either the forward (as shown) or rearward position. Thus, the field of vision for the driver is not obstructed by the headrest projecting over the top of the seat and no portion of the stays 2 will project from the seatback, thereby eliminating a potential hazard to a passenger seated in the rear seat. These advantages of the instant invention over the prior art headrests are seen by reference to FIG. 6. Prior art headrests, even when inclined, project above the top of the seat thus limiting the field of vision of a driver and posing a potential safety hazard to passengers in the rear seat. Moreover, through use of the present invention, the driver can easily incline the headrest of a back seat without having to lean over the front seats to reach the headrests on the back seats.

Various modifications to the headrest of the present invention will readily occur to those skilled in the art. The invention in its broader aspects is, therefore, not limited to the specific details, representative apparatus and illustrative example shown and described. Accordingly, departures may be made from such details without departing from the spirit or scope of the general inventive concept as defined by the appended claims and their equivalents.

What is claimed is:

1. A headrest apparatus disposed on a seatback frame comprising:
   a pair of guide rails connected to said seatback frame;
   a pair of stays connected to said headrest;
   a pair of shoes positioned for movement along said guide rails, each of said shoes supporting a separate one of said stays;
   a rod pivotably connected at its ends to said pair of shoes;
   means for moving said rod in an upward and downward direction thereby moving said shoes in their respective guide rails to raise and lower said headrest;
   a cam member attached at an upper portion of each said guide rail, each said cam member being provided with a cam surface configured to rotate said shoes and said stays between about 0° and 90° relative to said seatback frame to move said headrest apparatus to a desired inclined position relative said seatback frame.

2. The headrest apparatus of claim 1 wherein each said guide rail includes an edge surface located on an upper surface of said guide rail for guiding said shoe along said selected path.

3. The headrest apparatus of claim 1 wherein each said shoe is provided with an aperture through which the ends of said rod extend.

4. The headrest apparatus of claim 3 wherein each said guide rail has a lateral wall portion, each wall portion having an elongated hole in which the respective ends of the rod travel.

5. The headrest apparatus of claim 1 further comprising a nut connected to a central portion of said rod member.

6. The headrest apparatus of claim 1 wherein each said cam member has a slit therein and each said stay is provided with a flat portion movable through said slit in each said cam member to allow said stays to be rotated relative said seatback frame as said shoes move along said cam surface.

7. The headrest apparatus of claim 6 including an upper panel connected to said seatback frame and having a pair of holes therein through which said stays pass, and a pair of slits communicating with said holes through which said flat portions of said stays pass, and a lower panel fixedly connected to said seatback frame, said guide rails being interposed between said upper and lower panels.

8. The headrest apparatus of claim 5, wherein said means for moving said rod includes a threaded rod engageable with said nut to move said rod member and said shoes along said guide rails upon rotation of said threaded rod.

9. The headrest apparatus of claim 8 including means for providing a rotational torque to said threaded rod.

10. The headrest apparatus of claim 9 wherein said means for providing a rotational torque comprises a gear box engagable with said threaded rod, and a cable, connected at one end to said gear box and at the other end to an electric motor, said cable being rotated by said electric motor to thereby rotate said threaded rod.

11. A headrest apparatus disposed on a seatback frame comprising:
   a pair of guide rails connected to said seatback frame;
   a pair of stays connected to said headrest;
   a pair of shoes positioned for movement along said guide rails, each of said shoes supporting a separate one of said stays;
   a rod pivotably connected at its ends to said pair of shoes;
   a cam having a cam surface, attached at an upper portion of each said guide rail, for contacting respective ones of said shoes to rotate said shoes and said stays between about 0° and 90° relative to said seatback and thereby move said headrest to an inclined position;
   a nut connected to a central portion of said rod member; and
   a threaded rod engageable with said nut to move said nut and said rod member in an upward and downward direction, thereby moving said shoes along respective guide rails, upon rotation of said threaded rod.

12. The headrest apparatus of claim 11 wherein each said cam member has a slit therein and each said stay is provided with a flat portion movable through said slit in each said cam member to allow said stays to be rotated relative to said seatback frame as said shoes move along said cam surface.

13. The headrest apparatus of claim 12 including an upper panel, connected to said seatback frame, having a pair of holes therein through which said stays pass, and a pair of slits communicating with said holes through which said flat portions of said stays pass, and a lower panel fixedly connected to said seatback frame, said guide rails being interposed between said upper and lower panels.

14. The headrest apparatus of claim 11 including means for providing a rotational torque to said threaded rod.

15. The headrest apparatus of claim 11 wherein said means for providing a rotational torque comprises a gear box engagable with said threaded rod, and a cable, connected at one end to said gear box and at the other end to an electric motor, said cable being rotated by said electric motor to thereby rotate said threaded rod.

* * * * *